(12) United States Patent
Adams

(10) Patent No.: US 9,554,570 B2
(45) Date of Patent: Jan. 31, 2017

(54) BIRD CONTROL ASSEMBLIES FOR PROTECTING WIRES

(71) Applicant: HUBBELL INCORPORATED, Shelton, CT (US)

(72) Inventor: Jonathan Oral Adams, Columbia, MO (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 14/668,293

(22) Filed: Mar. 25, 2015

(65) Prior Publication Data

US 2015/0305322 A1    Oct. 29, 2015

Related U.S. Application Data

(60) Provisional application No. 61/970,244, filed on Mar. 25, 2014.

(51) Int. Cl.
*A01M 29/32*    (2011.01)
*H02G 7/00*    (2006.01)

(52) U.S. Cl.
CPC ............... *A01M 29/32* (2013.01); *H02G 7/00* (2013.01)

(58) Field of Classification Search
USPC .................................................. 174/138 R
See application file for complete search history.

(56) References Cited

U.S. PATENT DOCUMENTS

| | | |
|---|---|---|
| 3,632,069 A | 1/1972 | Thayer et al. |
| 5,332,179 A | 7/1994 | Kuffel et al. |
| 5,941,483 A | 8/1999 | Baginski |
| 6,250,023 B1 * | 6/2001 | Donoho ............... A01M 29/26 52/101 |
| 8,627,613 B2 * | 1/2014 | Parker ..................... H02G 7/00 52/101 |
| 2007/0137883 A1 | 6/2007 | Naidoo |

FOREIGN PATENT DOCUMENTS

| | | |
|---|---|---|
| WO | 9531099 | 11/1995 |
| WO | 0221911 A1 | 3/2002 |
| WO | 2010123614 A1 | 10/2010 |

OTHER PUBLICATIONS

International Search Report dated Jul. 2, 2015 from corresponding International Patent Application No. PCT/US15/22450, 4 pages.
International Written Opinion dated Jul. 2, 2015 from corresponding International Patent Application No. PCT/US15/22450, 6 pages.

* cited by examiner

*Primary Examiner* — Dhirubhai R Patel
(74) *Attorney, Agent, or Firm* — Ohlandt, Greeley, Ruggiero & Perle, L.L.P.

(57) ABSTRACT

Systems and methods for providing modular bird control deterrent devices with spikes for use with overhead electrical wire are provided. A modular bird control segment base provides locking support for one or more bird control spikes by including locking flanges in a spike support cavity of the segment base that engages and locks a spike by engaging a groove in the bottom portion of the respective spike. The bird control segment base provides attachment support for fasteners that secure the bird control segment base to the electrical wire in use by providing opposing slot openings in a groove on the top of the segment base to engage a fastener. The bird control segment base also has opposing fastening mechanisms for connecting multiple segments together.

9 Claims, 5 Drawing Sheets

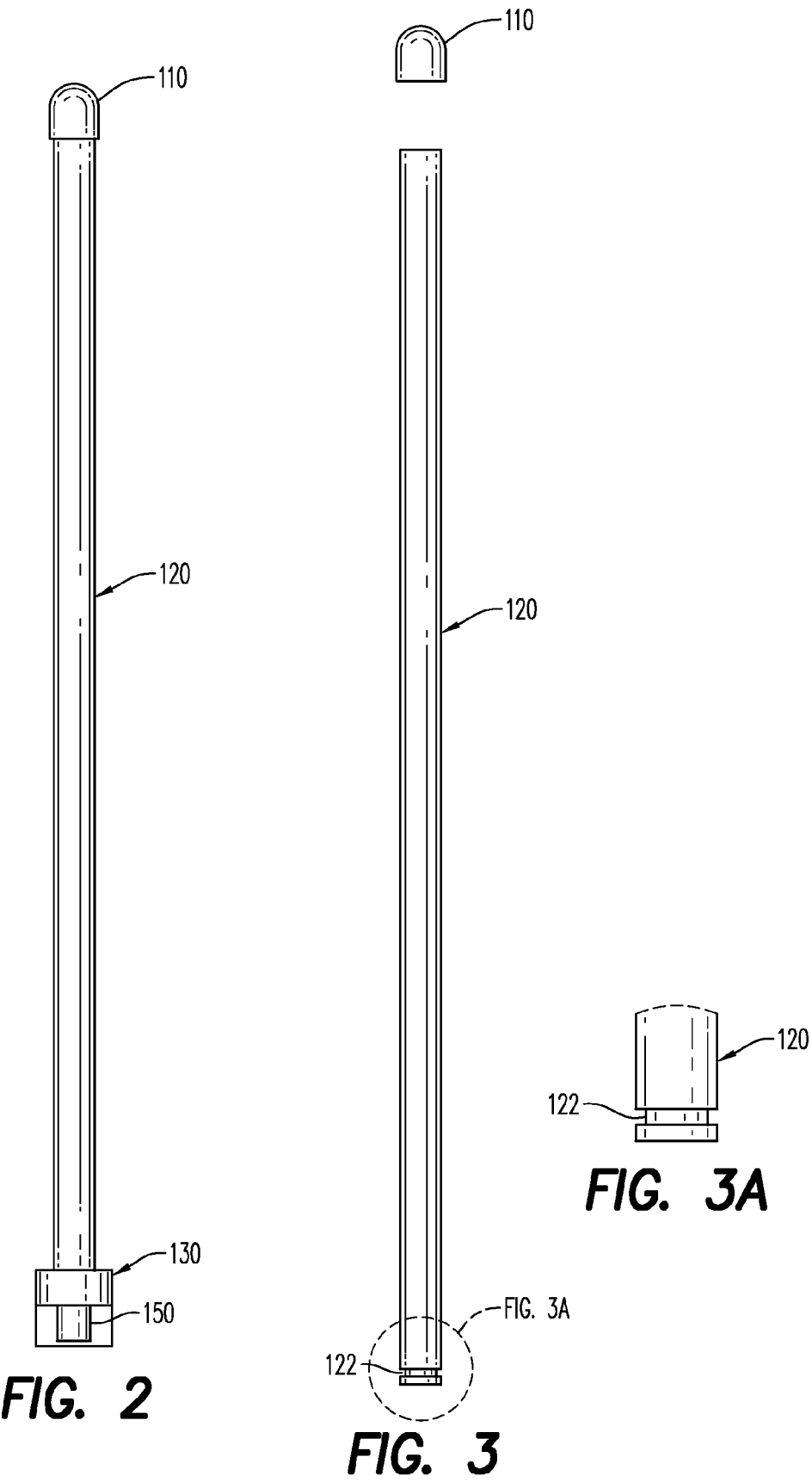

BIRD CONTROL ASSEMBLIES FOR PROTECTING WIRES

CROSS REFERENCE TO RELATED APPLICATIONS

This application claims the benefit of U.S. Provisional Application Ser. No. 61/970,244, filed Mar. 25, 2014, the entire contents of which are incorporated by reference herein.

BACKGROUND

1. Field of the Disclosure

The illustrative embodiments described in the present application are useful in systems including those for providing pest control and more particularly are useful in systems including those for providing bird control deterrent features for protecting electrical wire.

2. Description of Related Art

Many electric utilities employ metal conductor overhead electrical wires for the distribution of electricity. Birds, bats and other pests may be drawn to the electrical wires and may be detrimental to the electrical system.

Several bird control products exist, and there is a need, among other needs, for relatively more robust bird control products for electrical wires that include one or more features such as providing devices that are relatively inexpensive, relatively easy to assemble, that are relatively sturdy, relatively durable, modular and relatively easy to install.

SUMMARY

The present application describes illustrative embodiments of systems and methods of making and using systems for providing bird control deterrent features for protecting electrical wire. In certain illustrative embodiments, the systems and methods are useful in systems including those for providing inexpensive, sturdy, durable, modular and easy to assemble install bird control devices that are easy to install.

In one illustrative example, a bird control segment base provides locking support for one or more bird control spikes such as by including locking flanges in a spike support cavity of the segment base that engages and locks a spike by engaging a groove in the bottom portion of the respective spike.

In another illustrative embodiment, a bird control segment base provides attachment support for fasteners that secure the bird control segment base to the electrical wire in use. For example, opposing slot openings in a groove on the top of the segment base allow for a fastener such as a typical automobile engine hose clamp to be partially installed and supported by the slots during the installation process. The bird control segment base also has opposing fastening mechanisms on each end of the segment for connecting multiple segments together.

In some embodiments, a pest control assembly is provided that includes a modular base, a spike, and a fastener engaging cavity. The modular base has a spike mounting cavity with a locking mechanism for engaging the spike. The spike has a receiving mechanism for engaging the locking mechanism. The modular base includes first and second modular connectors for engaging other similar modular bases.

In some embodiments alone or in combination with the afore or aft mentioned embodiments, the pest control assembly is configured to control birds.

In some embodiments alone or in combination with the afore or aft mentioned embodiments, the modular base includes two spike mounting cavities.

In some embodiments alone or in combination with the afore or aft mentioned embodiments, the modular base includes three fastener engaging cavities, each including opposing slots in a respective cavity in the modular base.

In some embodiments alone or in combination with the afore or aft mentioned embodiments, the locking mechanism is a flange and the receiving mechanism is a groove in the spike.

In some embodiments alone or in combination with the afore or aft mentioned embodiments, the modular base includes high density polyethylene.

In some embodiments alone or in combination with the afore or aft mentioned embodiments, the fastener engaging cavity includes a slot for engaging a fastener.

In some embodiments alone or in combination with the afore or aft mentioned embodiments, the fastener engaging cavity includes two slots in a groove on a top surface and perpendicular to a length of the modular base.

In some embodiments alone or in combination with the afore or aft mentioned embodiments, the fastener is a clamp having a screw portion and a band having a screw thread pattern.

A pest control assembly is also provided that includes a base, a spike depending from the base, clamp cavity with first and second slots, and a clamp. The base has a top, a bottom, a first side, and a second side. The clamp cavity is in the top of the base with the first slot passing from the first side into the clamp cavity and the second slot passing from the second side into the clamp cavity. The clamp has a screw portion and a band with a screw thread pattern. The band has a first end secured to the screw portion and a second or loose end. The screw portion is in the clamp cavity with the band passing through the first slot such that the loose end is receivable by the screw portion after being passed through the second slot.

In some embodiments alone or in combination with the afore or aft mentioned embodiments, the pest control assembly further includes a spike receiving cavity in the base, the spike being secured in the spike receiving cavity.

In some embodiments alone or in combination with the afore or aft mentioned embodiments, the spike receiving cavity and the spike have intergaging locking mechanisms that secure the spike in the spike receiving cavity.

In some embodiments alone or in combination with the afore or aft mentioned embodiments, the intergaging locking mechanisms includes a flange and a groove, respectively.

In some embodiments alone or in combination with the afore or aft mentioned embodiments, the spike receiving cavity is defined in one or more of the top, the first side, the second side, and any combinations thereof.

In some embodiments alone or in combination with the afore or aft mentioned embodiments, the base includes a plurality of spike receiving cavities and a spike secured in each of the plurality of spike receiving cavities.

In some embodiments alone or in combination with the afore or aft mentioned embodiments, the base further includes a first end and a second end. The first end includes a first modular connector and the second end includes a second modular connector. The first and second modular connectors are connectable to one another so that the first modular connector of the base can be connected to the second modular connector of an adjacent base.

In some embodiments alone or in combination with the afore or aft mentioned embodiments, the base and/or the spike are high density polyethylene.

A method for protecting electrical wires is also provided. The method includes placing a base on the electric wire, the base having a clamp with a screw portion in a cavity of the base and a threaded band that depends from the screw portion passing through a first slot of the base; wrapping the threaded band around the wire and passing a loose end of the threaded band through a second slot of the base into the screw portion; threadably engaging the loose end of the threaded band and the screw portion; tightening the screw portion until the threaded band secures the base to the wire; and securing a spike to the base.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 2 is a front view of a representative modular bird control device according to an illustrative embodiment of the present application;

FIG. 3 is a side view with a partial exploded view of a bird control spike for use with the illustrative embodiment of FIG. 1;

DETAILED DESCRIPTION

Figure 1:
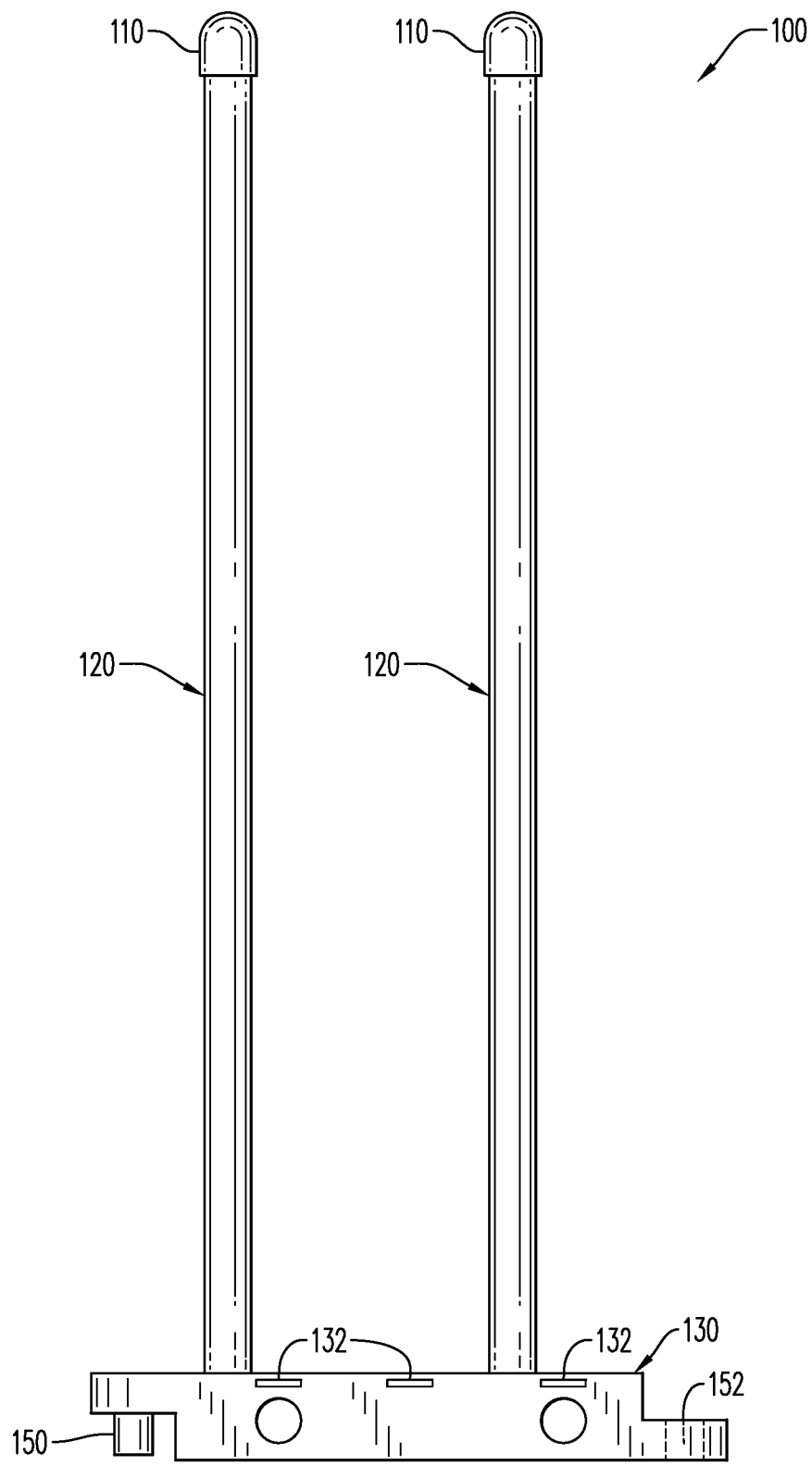
FIG. 1 is a side view of a representative modular bird control device according to an illustrative embodiment of the present application.

The illustrative embodiments of the present application describe systems and methods of making and using systems for providing bird control deterrent features for protecting electrical wire. The systems and methods are useful in systems including those for providing inexpensive, sturdy, durable, modular and easy to assemble install bird control devices that are easy to install. The illustrative embodiments are described with reference to bird control, but may be used for pest control generally. The number of spikes and fastener support slots may be varied as appropriate for a particular application.

In one illustrative example, a bird control segment base provides locking support for one or more bird control spikes such as by including locking flanges in a spike support cavity of the segment base that engages and locks a spike by engaging a groove in the bottom portion of the respective spike.

In another illustrative embodiment, a bird control segment base provides attachment support for fasteners that secure the bird control segment base to the electrical wire in use. For example, opposing slot openings in a groove on the top of the segment base allow for a fastener such as a typical automobile engine hose clamp to be partially installed and supported by the slots during the installation process. The bird control segment base also has opposing fastening mechanisms on each end of the segment for connecting multiple segments together. For example, a snap fit opposing locking feature may be provided with male and female portions each on the respective side of the modular base for connecting multiple modular bases together.

Certain bird control assemblies include smooth surfaced spikes that assembled into a smooth cavity in the base using a pressed in interference fit. Accordingly, that cavity or that the hole of the base and the exterior of the spike were smooth circular cross sections. With such a device, environmental conditions could cause the base to crack from the stress of having an interference fit and the spikes could fall out. The illustrative embodiments described herein solve this issue by adding a groove in the spike and a "snap lip" inside of the base that allowed the spike to positively engage with the base unit.

Additionally, certain bird control devices include slots in the top of a base. Unfortunately, such systems were hard to install on wire because the fastener had to be separately held during installation. The illustrative embodiments described herein solve this issue by adding a slotted feature so that the fastening hardware can be partially pre-installed and fed through the slot. The fastener then remains attached to the base while it is situated onto the structure it is being mounted and installation is much easier.

In the illustrative embodiments described herein, the base and spike components are constructed of black UV resistant high density polyethylene (HDPE). The fastening devices include stainless steel hose clamps. Other suitable materials such as other plastics may be used.

Referring to FIG. 1, a side view of a representative modular bird control device 100 according to an illustrative embodiment of the present application. Here HDPE base 130 includes 3 front slots 132 with respective back slots and respective cavity formed in a top portion of the base, wherein the slot is perpendicular to the length of the base. Other types of physical supports to engage a fastener such as a hose clamp can be fashioned using two raised portions of the base to define a channel or some other support structure. A male modular connector 150 is provided that may include a locking mechanism as described herein with reference to the spike mechanism and associated base spike mounting cavity mechanism. A respective female modular connector 152 is on the opposing end of the base. Spikes 120 are shown installed in the base 130 and are shown with caps 110 installed. The spikes may be solid or hollow cylinders.

Referring to FIG. 2, a front view of a representative modular bird control device 100 according to an illustrative embodiment of the present application is shown. Base 130 is shown with male modular connector 150 and spike 120 installed with cap 110 attached.

Referring to FIG. 3, a side view with a partial exploded view of a bird control spike 120 for use with the illustrative embodiment of FIG. 1 is shown. Here, cap 110 is shown disassembled from spike 120. Spike 120 is shown disassembled and detail A shows groove 122 that is provided as a spike receiving mechanism for locking into a flange of the respective base cavity.

Figure 4A:
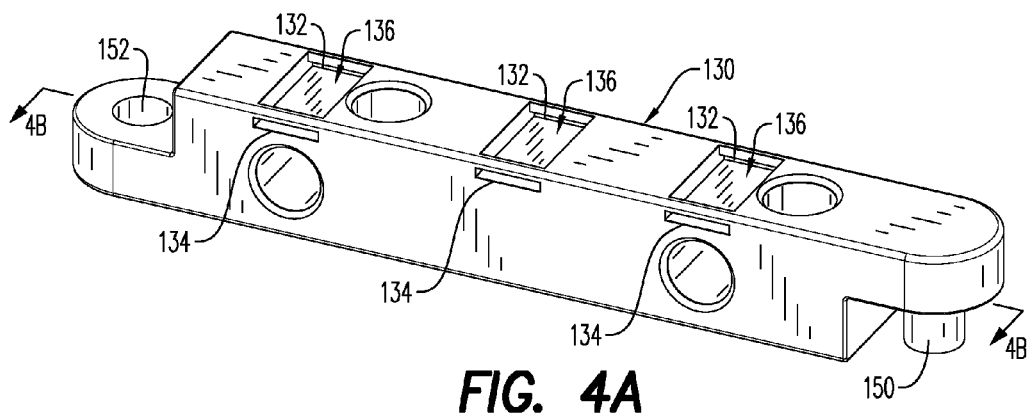
FIG. 4A is a top perspective cutaway view of the modular base according to FIG. 4A.
Figure 4B:
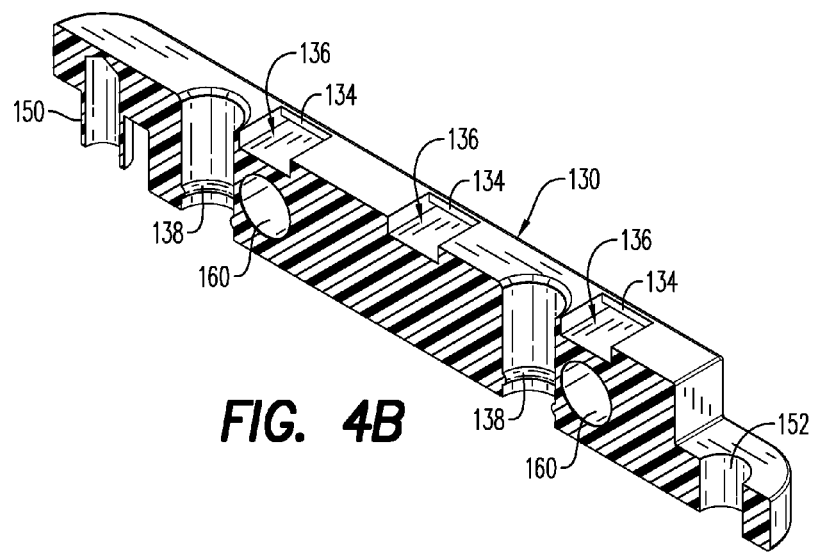
FIG. 4B is a top perspective view of a representative modular base of a modular bird control device according to FIG. 1.

Referring to FIG. 4B, a top perspective view of a representative modular base 130 of a modular bird control device 100 according to FIG. 1 is shown. Here, each cavity 136 is shown running perpendicular to the length of the top of the base. A first slot 132 in each cavity is shown on one end of the cavity 136 and a second slot 134 is shown on the opposing side of each cavity 136. Here, the top of the slots are flush with the top of the base. Each slot is for engaging a fastening device and engaging it to hold it during the installation process.

Referring to FIG. 4B, a top perspective cutaway view of the modular base 130 according to FIG. 4A is shown. Here, each cavity 136 is shown running perpendicular to the length of the top of the base. A second slot 134 is shown on the depicted side of each cavity 136. Here, the top of the slots are flush with the top of the base. Each slot is for engaging a fastening device and engaging it to hold it during the installation process. The cutaway shows internal flanges 138 that act as a locking mechanism for the base to engage and lock in the spikes. Here, modular connector 150 is shown as hollow, but could instead be solid. Cavity 160 may also be configured to engage bird control spike and may be used to reduce the weight and material usage in the base.

Figure 5:
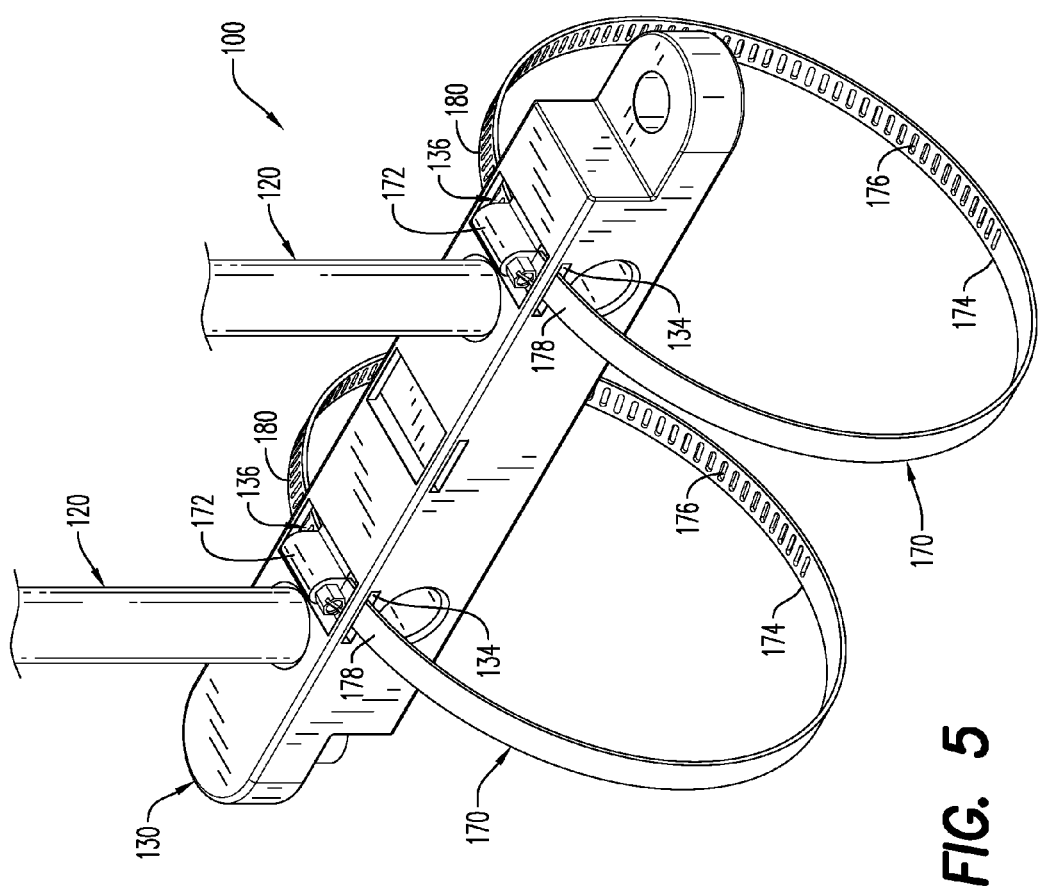
FIG. 5 is a side perspective view of a representative modular bird control device having fastening devices attached according to an illustrative embodiment of the present application.

Referring to FIG. 5, a side perspective view of a representative modular bird control device 100 having fastening devices 170 attached according to an illustrative embodiment of the present application is shown. Here, fastening devices 170 are stainless steel hose clamps and are shown installed in the modular base 130 with screw portions 172 partially disposed in respective grooves 136.

Hose clamp 170 includes a galvanized or stainless steel band 174 into which a screw thread pattern 176 has been formed. The band 174 has a first end 178 secured to screw portion 172 and a second or loose end 180 that removably received in the screw portion. When the screw portion 172 is turned a first direction, the screw portion acts as a worm drive on the screw pattern 178 to pull on the loose end 180 into the screw portion to tighten the clamp around the wire to be protected. Conversely, when the screw portion 172 is turned a second, opposite direction, the screw portion acts as a worm drive on the screw pattern 178 to push the loose end 180 away from the screw portion to loosen the clamp from the wire to be protected.

During assembly, the clamp 170 is opened—by removing the loose end 180 from screw portion 172. The loose end 180 is first passed through one of the slots 132, 134 of base 130 so that the screw portion is received in cavity 136. In this manner, the clamp 170 is held in the desired position in the base 130 while the base is placed on a wire to be protected. Then, the loose end 180 is fed through the remaining slot 132, 134 of the base 130 until the loose end is received by screw portion 172.

Advantageously, clamp 170 provides a more secure connection between base 130 and the wire to be protected than previously possible, temporarily secures the clamp to the base to make the securement of the base to the wire easier, and allows replacement of the clamp if necessary.

Figure 6:
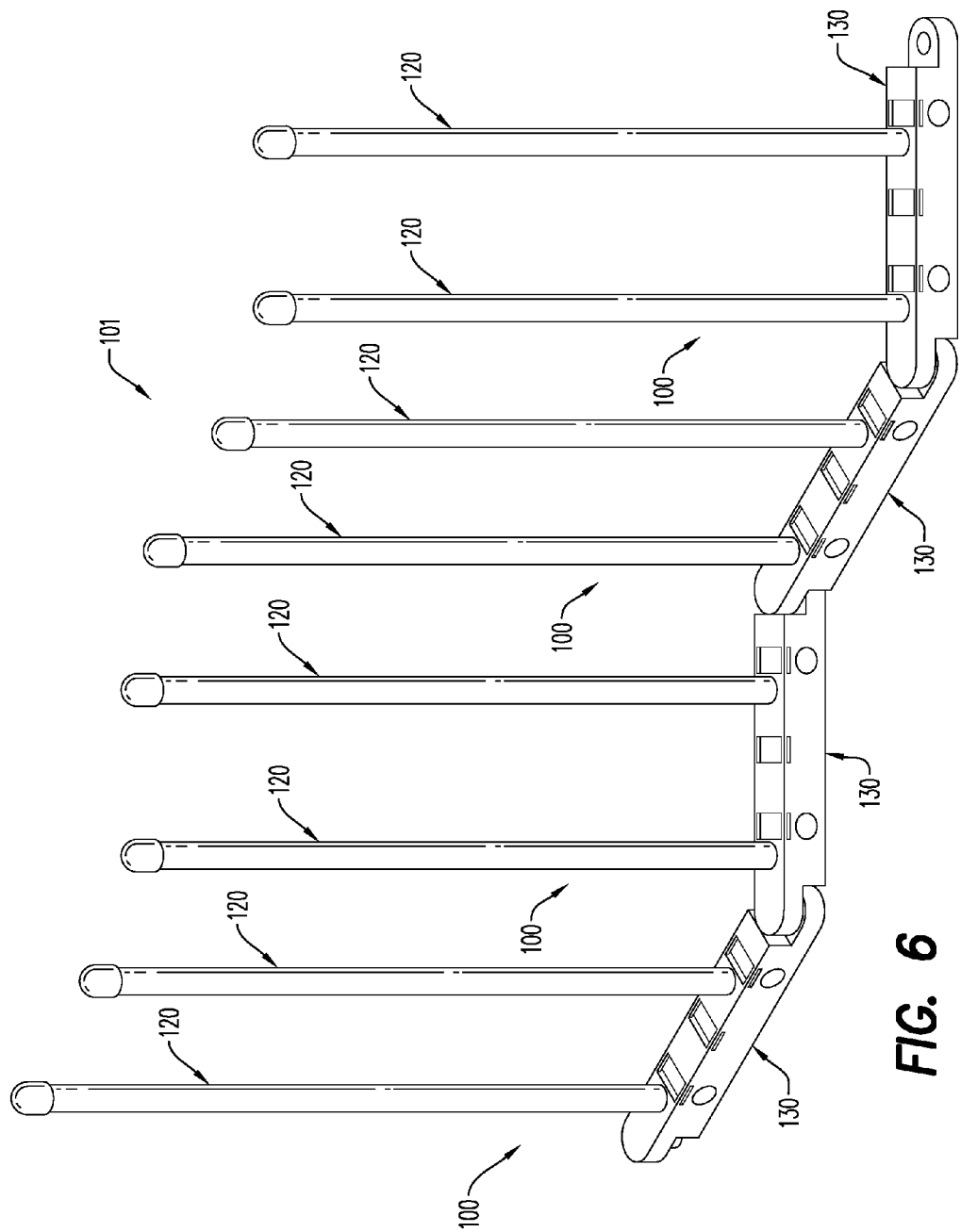
FIG. 6 is a side perspective view of a representative bird control device having four modular sections connected according to an illustrative embodiment of the present application.

Referring to FIG. 6, a side perspective view of a representative bird control device 101 having four modular sections 100 connected according to an illustrative embodiment of the present application is shown. Here, 4 modular sections 100 are connected using connectors 150, 152 to create a longer bird control device 101.

While illustrative embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A pest control assembly comprising:
   a base having a top, a bottom, a first side, and a second side;
   a spike depending from the base;
   a clamp cavity in the top of the base;
   a first slot passing from the first side into the clamp cavity;
   a second slot passing from the second side into the clamp cavity; and
   a clamp having a screw portion and a band having a screw thread pattern, the band having a first end secured to the screw portion and a second or loose end, the screw portion being positioned in the clamp cavity in the top of the base with the band passing through the first slot such that the loose end is receivable by the screw portion after being passed through the second slot.

2. The pest control assembly of claim 1, further comprising a spike receiving cavity in the base, the spike being secured in the spike receiving cavity.

3. The pest control assembly of claim 2, wherein the spike receiving cavity and the spike having intergaging locking mechanisms that secure the spike in the spike receiving cavity.

4. The pest control assembly of claim 3, wherein the intergaging locking mechanisms comprise a flange and a groove, respectively.

5. The pest control assembly of claim 2, wherein the spike receiving cavity is defined in one or more of the top, the first side, the second side, and any combinations thereof.

6. The pest control assembly of claim 2, wherein the base comprises a plurality of spike receiving cavities and wherein the spike comprises a plurality of spikes, a respective one of the plurality of spikes being secured in each of the plurality of spike receiving cavities.

7. The pest control assembly of claim 1, wherein the base further comprises a first end and a second end, the first end having a first modular connector and the second end having a second modular connector, the first and second modular connectors being connectable to one another so that the first modular connector of the base can be connected to the second modular connector of an adjacent base.

8. The pest control assembly of claim 1, wherein the base and/or the spike comprise high density polyethylene.

9. A method for protecting electrical wires, comprising:
   placing a bottom of a base on the electric wire, the base having a clamp with a screw portion in a cavity at a top of the base and a threaded band that depends from the screw portion passing through a first slot of the base;
   wrapping the threaded band around the wire and passing a loose end of the threaded band through a second slot of the base into the screw portion;
   threadably engaging the loose end of the threaded band and the screw portion;
   tightening the screw portion in the cavity at the top of the base until the threaded band secures the base to the wire; and
   securing a spike to the base.

* * * * *